United States Patent
Makino et al.

(10) Patent No.: US 10,168,140 B2
(45) Date of Patent: Jan. 1, 2019

(54) LIGHT DETECTION MODULE FOR OCT DEVICE AND OCT DEVICE

(71) Applicant: HAMAMATSU PHOTONICS K.K., Hamamatsu-shi, Shizuoka (JP)

(72) Inventors: Kenji Makino, Hamamatsu-shi (JP); Masato Inagaki, Hamamatsu-shi (JP); Kei Tabata, Hamamatsu-shi (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/516,699

(22) PCT Filed: Oct. 8, 2015

(86) PCT No.: PCT/JP2015/078575
§ 371 (c)(1),
(2) Date: Apr. 4, 2017

(87) PCT Pub. No.: WO2016/056615
PCT Pub. Date: Apr. 14, 2016

(65) Prior Publication Data
US 2017/0292826 A1    Oct. 12, 2017

(30) Foreign Application Priority Data

Oct. 9, 2014    (JP) .................... 2014-208297

(51) Int. Cl.
*G01B 9/02*    (2006.01)
*G01J 1/04*    (2006.01)

(52) U.S. Cl.
CPC ..... *G01B 9/02091* (2013.01); *G01B 9/02041* (2013.01); *G01B 9/02061* (2013.01); *G01J 1/0411* (2013.01)

(58) Field of Classification Search
CPC .... G01B 9/02; G01N 21/4795; A61B 5/0066; A61B 5/6852; A61B 5/0073
(Continued)

(56) References Cited

U.S. PATENT DOCUMENTS 7,365,856 B2 *    4/2008    Everett ............. A61B 3/102
                                               250/227.19
9,658,054 B2 *    5/2017    Osawa ............. G01B 9/02091
(Continued)

FOREIGN PATENT DOCUMENTS

CN    102281811 A    12/2011
CN    103230260 A    8/2013
(Continued)

OTHER PUBLICATIONS

English-language translation of International Preliminary Report on Patentability (IPRP) dated Apr. 20, 2017 that issued in WO Patent Application No. PCT/JP2015/078575.

*Primary Examiner* — Md M Rahman
(74) *Attorney, Agent, or Firm* — Drinker Biddle & Reath LLP

(57) ABSTRACT

A light detecting module that detects interference light that has exited an exit end surface of an optical fiber in an OCT instrument includes: a ball lens including an incident surface entered by the interference light that has exited the exit end surface, and an exit surface exited by the interference light that has entered the incident surface; and a photodiode including a detecting surface entered by the interference light that has exited the exit surface. The interference light obliquely enters the incident surface with respect to a perpendicular line at an incident position of the interference light. The interference light obliquely exits the exit surface with respect to a perpendicular line at an exit position of the interference light. The interference light obliquely enters the detecting surface with respect to a perpendicular line at an incident position of the interference light.

8 Claims, 7 Drawing Sheets

(58) Field of Classification Search
USPC .......................................................... 356/479
See application file for complete search history.

(56) References Cited

U.S. PATENT DOCUMENTS

| | | | |
|---|---|---|---|
| 2001/0007502 A1* | 7/2001 | Kanda | G01B 9/02051 356/512 |
| 2003/0091304 A1 | 5/2003 | Tonai et al. | |
| 2009/0002713 A1 | 1/2009 | Ohbayashi et al. | |
| 2009/0190883 A1 | 7/2009 | Kato et al. | |
| 2013/0128264 A1* | 5/2013 | Wax | G01B 9/02044 356/300 |
| 2014/0037245 A1* | 2/2014 | Sinclair | A61B 5/0082 385/33 |
| 2014/0204389 A1* | 7/2014 | Mukoh | G01B 9/02091 356/479 |
| 2015/0092160 A1* | 4/2015 | Chen | A61B 3/0025 351/206 |
| 2015/0245765 A1* | 9/2015 | Fujii | A61B 3/0091 351/206 |
| 2016/0089020 A1* | 3/2016 | Gomi | A61B 3/102 351/206 |
| 2017/0325679 A1* | 11/2017 | Ishiai | A61B 3/102 |

FOREIGN PATENT DOCUMENTS

| | | |
|---|---|---|
| JP | H08-043692 A | 2/1996 |
| JP | 2001-264246 A | 9/2001 |
| JP | 2004-223269 A | 8/2004 |
| JP | 2006-300801 A | 11/2006 |
| WO | WO-02/093224 A1 | 11/2002 |

\* cited by examiner

Fig.5
(a)
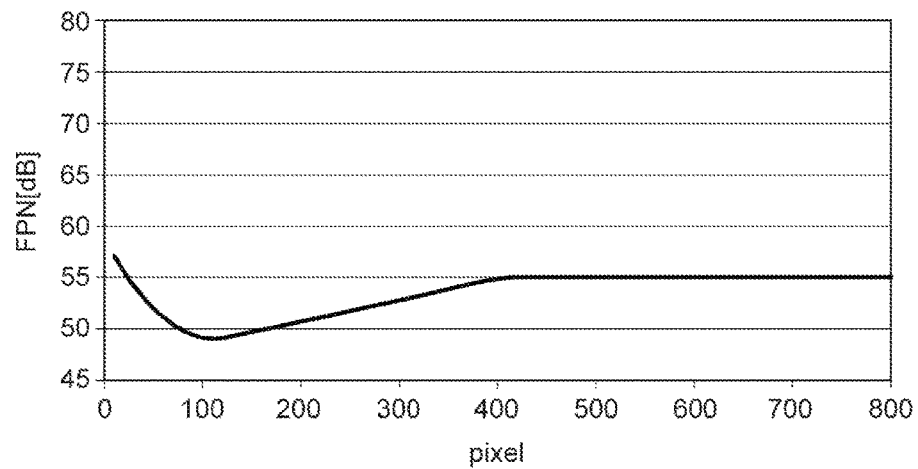
(b)
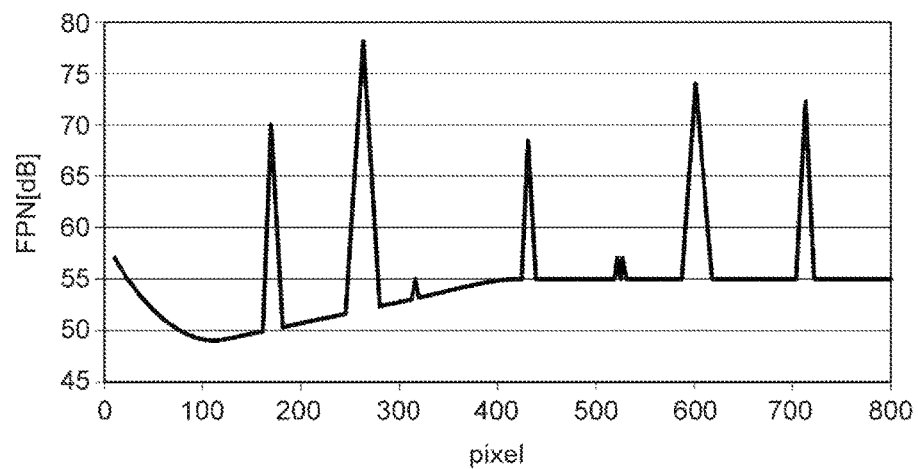

LIGHT DETECTION MODULE FOR OCT DEVICE AND OCT DEVICE

TECHNICAL FIELD

The present invention relates to a light detecting module for an OCT instrument and an OCT instrument.

BACKGROUND ART

Known optical coherence tomography (OCT) instruments obtain tomographic images of objects by measuring distributions of amounts of reflection in the depth directions of objects using optical interference (for example, Patent Literature 1 and 2). The OCT instrument has been used for a biological diagnosis of, for example, an eyeball and a tooth since the OCT instrument can create an image of the internal structure of an object with high spatial resolution.

In the OCT instruments described in Patent Literature 1 and 2, light is separated into measurement light and reference light and an object to be measured is irradiated with the separated measurement light. The measurement light reflected on the object to be measured is combined with the reference light and generates interference light. This interference light is detected with a photodetector. An intensity distribution of reflection light in the depth direction of the object is measured as a one-dimensional tomographic image by analyzing the detection result. Moreover, a two-dimensional or three-dimensional tomographic image can be obtained by scanning a position to be irradiated, in the object, with the measurement light.

CITATION LIST

Patent Literature

Patent Literature 1: Japanese Unexamined Patent Publication No. 2001-264246
Patent Literature 2: Japanese Unexamined Patent Publication No. 2004-223269

SUMMARY OF INVENTION

Technical Problem

The OCT instruments described in Patent Literature 1 and 2 suppress return light in order to remove noise, in probes that guide the measurement light. Furthermore, the OCT instrument described in Patent Literature 2 suppresses return light even in a delay line of the reference light.

However, such a conventional OCT instrument cannot sufficiently reduce fixed pattern noise (FPN). The fixed pattern noise appears at a specific position in the depth direction of a tomographic image, as an image which does not practically exist.

Therefore, it is desired that the fixed pattern noise be sufficiently reduced in the present technical field.

Solution to Problem

The inventors have conducted research on an OCT instrument. As a result, the inventors have found a fact that the position where fixed pattern noise appears on a tomographic image obtained by using the conventional OCT instrument corresponds to an optical path length of interference light concerning an optical lens used in a light detecting module. In other words, the inventors have understood that the fixed pattern noise appears at a specific position in the depth direction of the tomographic image due to the interference light being reflected multiple times in the optical lens. The inventors have focused on these facts that they have found. The inventors have further conducted the research with diligence on a configuration of the light detecting module that sufficiently reduces the fixed pattern noise, and then reached the present invention.

A light detecting module for an OCT instrument according to one aspect of the present invention is a light detecting module that detects interference light that has exited an exit end surface of an optical fiber in an OCT instrument. The light detecting module for an OCT instrument includes an optical lens and a photodetector. The optical lens includes an incident surface and an exit surface. The interference light that has exited the exit end surface enters the incident surface. The interference light that has entered the incident surface exits the exit surface. The photodetector includes a detecting surface. The interference light that has exited the exit surface enters the detecting surface. The incident surface is disposed in such a manner that the interference light obliquely enters with respect to a perpendicular line at an incident position of the interference light. The exit surface is disposed in such a manner that the interference light obliquely exits with respect to a perpendicular line at an exit position of the interference light. The detecting surface is disposed in such a manner that the interference light obliquely enters with respect to a perpendicular line at an incident position of the interference light.

In the aspect, multiple reflection of the interference light on the optical path between the exit end surface of the optical fiber and the detecting surface of the photodetector is prevented. Therefore, the fixed pattern noise can be sufficiently reduced.

A light detecting module for an OCT instrument according to one aspect of the present invention may further include a cover part. An opening is formed on the cover part. The cover part covers the optical lens. In this case, light other than the interference light can be prevented from being detected by the photodetector. As a result, noise due to light other than the interference light hardly appears on a tomographic image.

A light detecting module for an OCT instrument according to one aspect of the present invention may further include a positioning part. The positioning part defines the position of the optical fiber and positions the exit end surface with respect to the opening. In this case, the position of the optical fiber is defined. Therefore, the positions of the optical lens and the photodetector are set easily.

The optical lens may be a ball lens. The optical lens may be a fused lens. The optical lens may be a plurality of lenses disposed spatially apart from each other.

The optical lens may further include: a plurality of regions with different refractive indices on an optical path between the incident surface and the exit surface; and interfaces entered by the interference light between the plurality of regions. The interface may be disposed in such a manner that the interference light obliquely enters with respect to a perpendicular line at an incident position of the interference light. This prevents the multiple reflection of the interference light at the interfaces between the plurality of regions. Therefore, the fixed pattern noise can be sufficiently reduced.

An OCT instrument according to one aspect of the present invention includes any of the light detecting modules for an OCT instrument mentioned above.

In the present aspect, the fixed pattern noise can be sufficiently reduced as mentioned above.

Advantageous Effects of Invention

According to the one aspect of the present invention, a light detecting module for an OCT instrument and an OCT instrument that can sufficiently reduce fixed pattern noise can be provided.

BRIEF DESCRIPTION OF DRAWINGS

FIG. 5(a) is a graph illustrating an intensity distribution of reflection light measured by an OCT instrument of an example. FIG. 5(b) is a graph illustrating an intensity distribution of reflection light measured by an OCT instrument of a comparative example.

DESCRIPTION OF EMBODIMENTS

Hereinafter, an embodiment of the present invention will be described in detail with reference to the drawings. Note that, in the description, the same signs are used for the same components and components having the same functions, and the overlapping description will be omitted.

Figure 1:
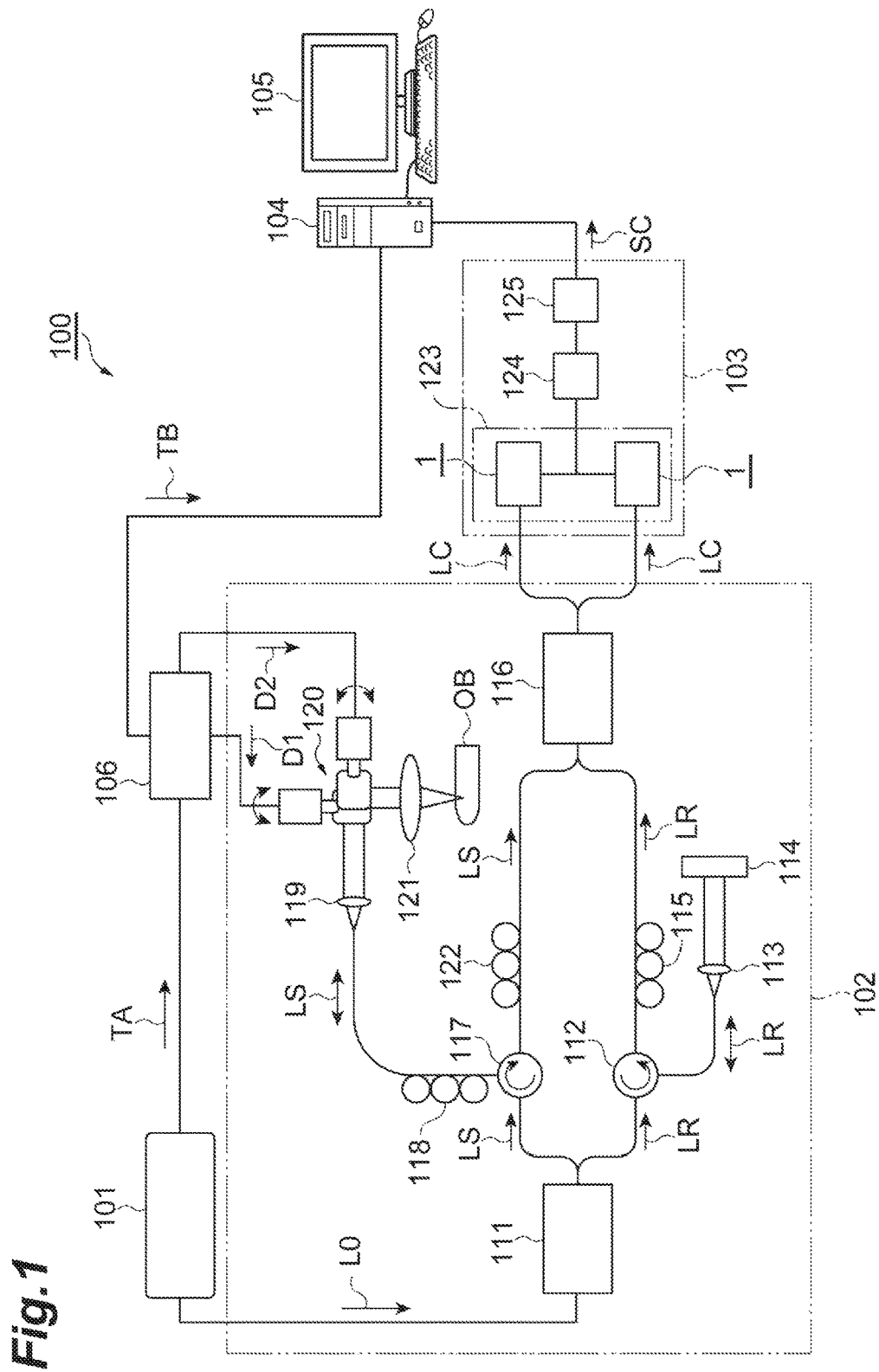
FIG. 1 is a block diagram of an OCT instrument according to the present embodiment.

A configuration of an OCT instrument 100 will be described with reference to FIG. 1. FIG. 1 is a block diagram of the OCT instrument according to the present embodiment.

The OCT instrument 100 is configured to obtain a tomographic image of an object OB by, for example, a swept-source OCT (SS-OCT) system. In the SS-OCT system, an interference light spectrum is detected while a wavelength of low coherent light emitted from a light source 101 is temporally changed. The tomographic image of the object OB is obtained as a sample on the basis of the result of Fourier transform of the interference light spectrum. The OCT instrument 100 includes the light source 101, an interference unit 102, a detecting unit 103, an arithmetic unit 104, a monitor 105, and a function generator 106.

The light source 101 is a wavelength-swept light source. The light source 101 includes, for example, a KTN crystal. The KTN crystal is a transparent optical crystal including potassium (K), tantalum (Ta), niobium (Nb), and oxygen. The light source 101 emits laser light L0 in which a frequency thereof changes in a fixed range. The laser light L0 emitted from the light source 101 enters a coupler 111 disposed in the interference unit 102. The coupler 111 separates the entered laser light L0 into measurement light LS and reference light LR. The coupler 111 separates the laser light L0 into the measurement light LS and the reference light LR at a separation ratio of, for example, 90:10 respectively.

The reference light LR enters a collimating lens 113 through a circulator 112. The collimating lens 113 causes the reference light LR to be parallel light. The reference light LR, which has been made into the parallel light by the collimating lens 113 and exited, irradiates a reference mirror 114. The reference light LR reflected by the reference mirror 114 enters a polarization controller 115 through the collimating lens 113 and the circulator 112. The polarization controller 115 adjusts the polarization of the passing reference light LR. The reference light LR that has exited the polarization controller 115 enters a coupler 116.

The measurement light LS enters a polarization controller 118 through a circulator 117. The polarization controller 118 adjusts the polarization of the passing measurement light LS. The measurement light LS that has exited the polarization controller 118 enters a collimating lens 119. The collimating lens 119 causes the measurement light LS to be parallel light. The measurement light LS that has exited the collimating lens 119 enters a galvanometer mirror 120. The galvanometer mirror 120 includes two reflection mirrors. The galvanometer mirror 120 controls the optical path of the measurement light LS.

The measurement light LS reflected by the galvanometer mirror 120 is concentrated by a focusing lens 121. The measurement light LS concentrated by the focusing lens 121 irradiates the object OB. The measurement light LS reflected by the object OB enters the coupler 116 through the focusing lens 121, the galvanometer mirror 120, the collimating lens 119, the polarization controller 118, the circulator 117, and a polarization controller 122.

The coupler 116 multiplexes the reference light LR and the measurement light LS and makes them interfere with each other. Interference light LC generated from this interference is separated into two at a ratio of 50:50. The separated beams of interference light LC respectively enter two light detecting modules 1 for the OCT instrument (hereinafter, also simply referred to as "light detecting module 1") disposed in the detecting unit 103. The two light detecting modules 1 configure a balance detector 123 that detects an interference signal of the interference light LC. Details of the light detecting module 1 will be mentioned below. The balance detector 123 outputs a current signal as the interference signal to an I/V amplifier 124.

The I/V amplifier 124 converts the current signal input from the balance detector 123 into a voltage signal and amplifies the same. The I/V amplifier 124 outputs the converted and amplified voltage signal to an amplifier 125. The amplifier 125 equalizes and amplifies the voltage signal input from the I/V amplifier 124 to an adequate amplitude level suitable for input to the arithmetic unit 104. The amplifier 125 outputs the equalized and amplified voltage signal as an interference signal SC to the arithmetic unit 104.

The arithmetic unit 104 is, for example, a personal computer. The arithmetic unit 104 subjects the interference light spectrum to Fourier transform. The arithmetic unit 104 creates the intensity distribution of reflection light returned from a plurality of specific depth positions in the object OB, on the basis of the result of the Fourier transform. The arithmetic unit 104 creates the tomographic image on the basis of the created intensity distribution of reflection light. This tomographic image is displayed on the monitor 105.

The light source 101 inputs an A scan trigger signal TA to the function generator 106. The A scan trigger signal TA synchronizes with a swept frequency of the light source 101. The A scan trigger signal TA is used as a synchronous signal (raster trigger) for obtaining one-dimensional information in the depth direction (A scan). The function generator 106 converts the input A scan trigger signal TA into a B scan trigger signal TB. The function generator 106 further converts the B scan trigger signal TB into driving signals D1 and D2. The function generator 106 outputs the B scan trigger signal TB to the arithmetic unit 104. The function generator 106 outputs the driving signals D1 and D2 to the galvanometer mirror 120.

The galvanometer mirror 120 drives the two reflection mirrors on the basis of the driving signals D1 and D2. This is how the galvanometer mirror 120 two-dimensionally scans (B scan) the object OB with the measurement light LS within a set measurement range. The arithmetic unit 104 disposes the tomographic images on the basis of the B scan trigger signal TB. In this manner, the arithmetic unit 104 creates the two-dimensional and three-dimensional tomographic images.

Figure 2:
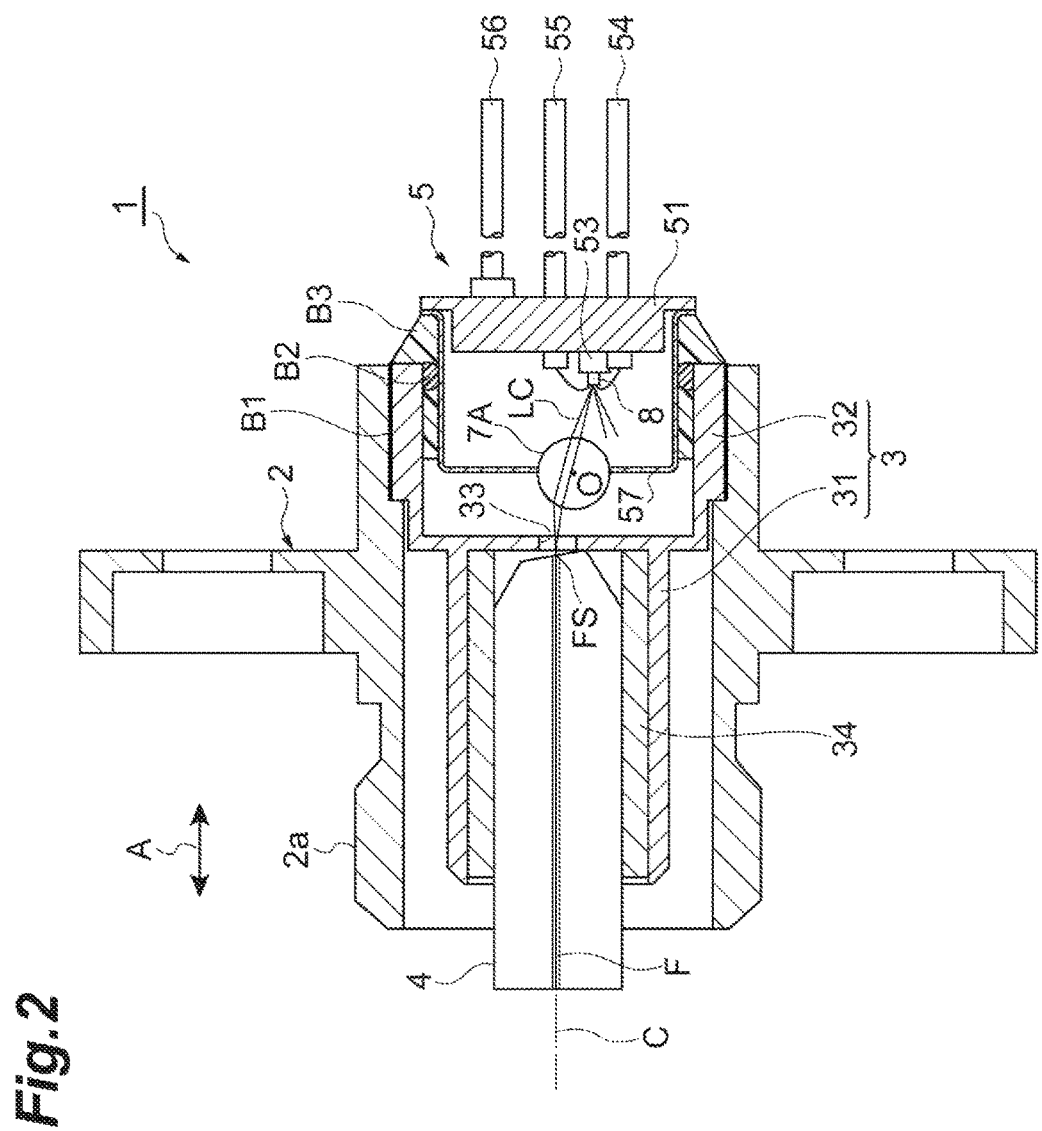
FIG. 2 is a cross-sectional view illustrating a configuration of a light detecting module for the OCT instrument in FIG. 1.
Figure 3:
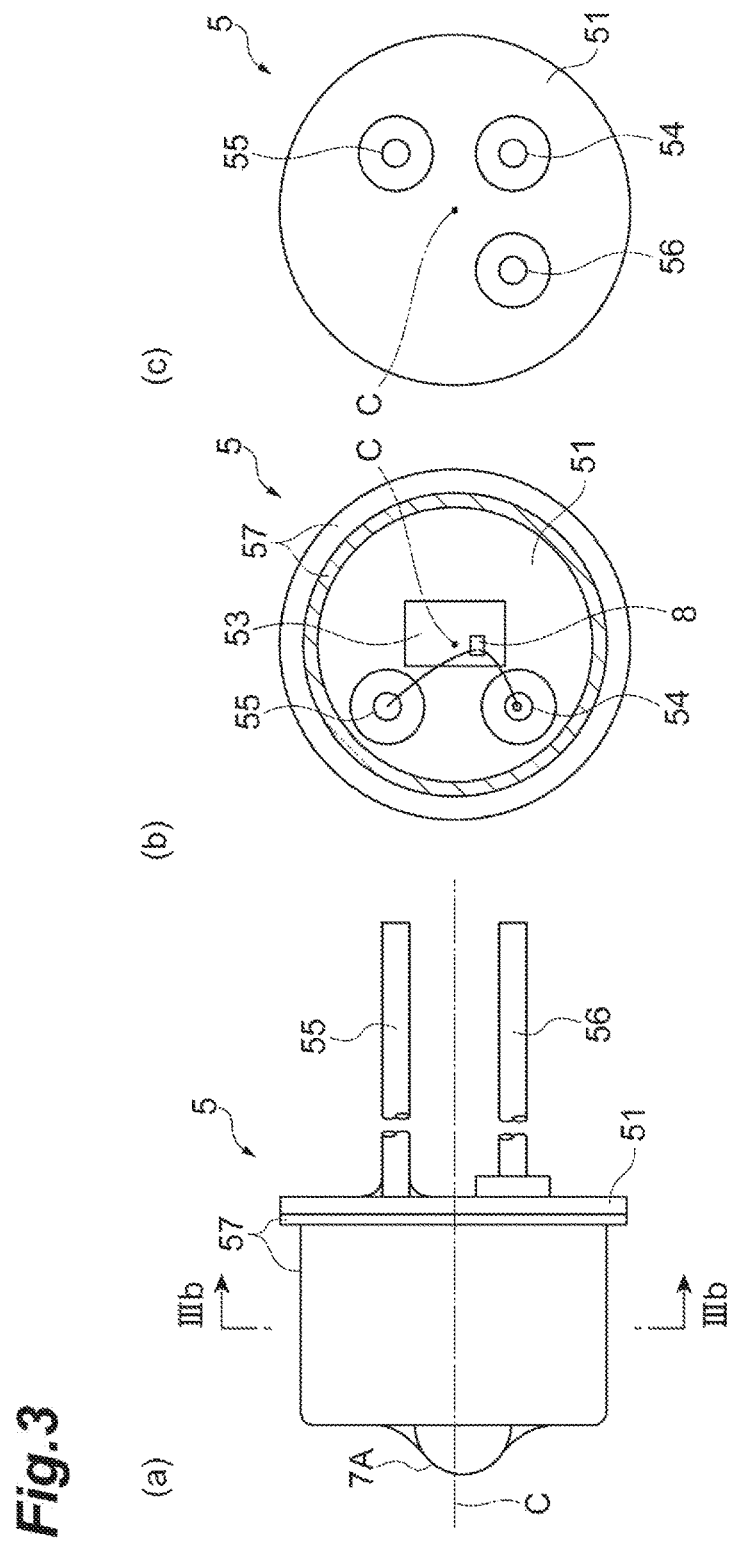
FIG. 3 is a view describing a configuration of a CAN device in FIG. 2.

Subsequently, a configuration of the light detecting module 1 for the OCT instrument will be described in detail with reference to FIGS. 2 and 3. FIG. 2 is a cross-sectional view illustrating the configuration of the light detecting module for the OCT instrument in FIG. 1. FIG. 3 is a view describing a configuration of a CAN device in FIG. 2. FIG. 3(a) is a side view of the CAN device. FIG. 3(b) is a cross-sectional view along line IIIb-IIIb in FIG. 3(a). FIG. 3(c) is a bottom view of the CAN device.

In the OCT instrument 100 (refer to FIG. 1), the light detecting module 1 is disposed in the detecting unit 103 (refer to FIG. 1) and detects the interference light LC. The interference light LC is guided by an optical fiber F from the interference unit 102 (refer to FIG. 1) and exits an exit end surface FS. The light detecting module 1 includes a housing 2, a receptacle 3 housed in the housing 2, a CAN device 5 inserted into the receptacle 3, a first insertion part (positioning part) 31 and a second insertion part (cover part) 32 that configure a part of the receptacle 3, a ball lens (optical lens) 7A provided in the CAN device 5, and a photodiode (photodetector) 8.

The housing 2 includes a cylindrical body 2a with both ends opened. The housing 2 houses the receptacle 3 inside the cylindrical body 2a. The receptacle 3 includes the first insertion part 31 on one side of a predetermined direction A, and the second insertion part 32 on the other side of the predetermined direction A. The first insertion part 31 is cylindrical and an end surface thereof on the one side is opened. The outer diameter of the first insertion part 31 is smaller than the inner diameter of the housing 2. A ferrule 4 is inserted into the first insertion part 31. The second insertion part 32 is cylindrical and an end surface thereof in the other direction is opened. The outer diameter of the second insertion part 32 is equivalent to the inner diameter of the housing 2. The CAN device 5 is inserted into the second insertion part 32. The first insertion part 31 and the second insertion part 32 have shapes in which bottom parts thereof are unified. An opening 33 is formed at the center of the bottom part, through which the interference light LC passes.

The outer surface of the second insertion part 32 is adhered to the inner surface of the housing 2 with, for example, an adhesive B1. As a result, the receptacle 3 is fixed and housed inside the housing 2. The CAN device 5 is adhered to the inner surface of the second insertion part 32 with, for example, adhesives B2 and B3. The core of the CAN device 5 is aligned at an optimal position with respect to the optical path. The adhesive B2 is, for example, a UV curable resin. The adhesive B2 temporarily fixes the CAN device 5 to the inner surface of the second insertion part 32. The adhesive B3 is a thermosetting resin. The adhesive B3 permanently fixes the CAN device 5 that has been temporarily fixed with the adhesive B2, to the inner surface of the second insertion part 32. Although the aligned CAN device 5 is fixed with the adhesive here, the aligned CAN device 5 may be fixed by being welded through, for example, irradiation with YAG laser without use of an adhesive.

The first insertion part 31 functions as a positioning part for defining the position of the optical fiber F inserted inside the ferrule 4 via a sleeve 34 and the ferrule 4, and positioning the exit end surface FS with respect to the opening 33. The second insertion part 32 functions as a cover part for covering the ball lens 7A. The opening 33 through which the interference light LC passes is formed on the second insertion part 32. Center axes C of the housing 2, the first insertion part 31, the second insertion part 32, the CAN device 5, and the ferrule 4 mutually match.

The CAN device 5 has a configuration of a so-called TO-CAN device. The CAN device 5 includes a sub-mount 53, lead pins 54 to 56, and a lens cap 57. The sub-mount 53 is provided on a base 51. The lead pins 54 to 56 penetrate the base 51. The lens cap 57 is provided in such a manner that it covers the base 51 and the sub-mount 53. The lens cap 57 holds the ball lens 7A positioned with respect to the opening 33. The ball lens 7A is disposed in such a manner that a gravity center O thereof deviates from the center axis C by a predetermined distance.

The photodiode 8 is provided on the sub-mount 53. The photodiode 8 is disposed at a position deviating a predetermined distance from the center axis C on the sub-mount 53. The lead pin 54 is bonded to a cathode terminal of the photodiode 8 by a wire. The lead pin 55 is bonded to an anode terminal of the photodiode 8 by a wire. The lead pin 56 is connected to a GND.

Figure 4:
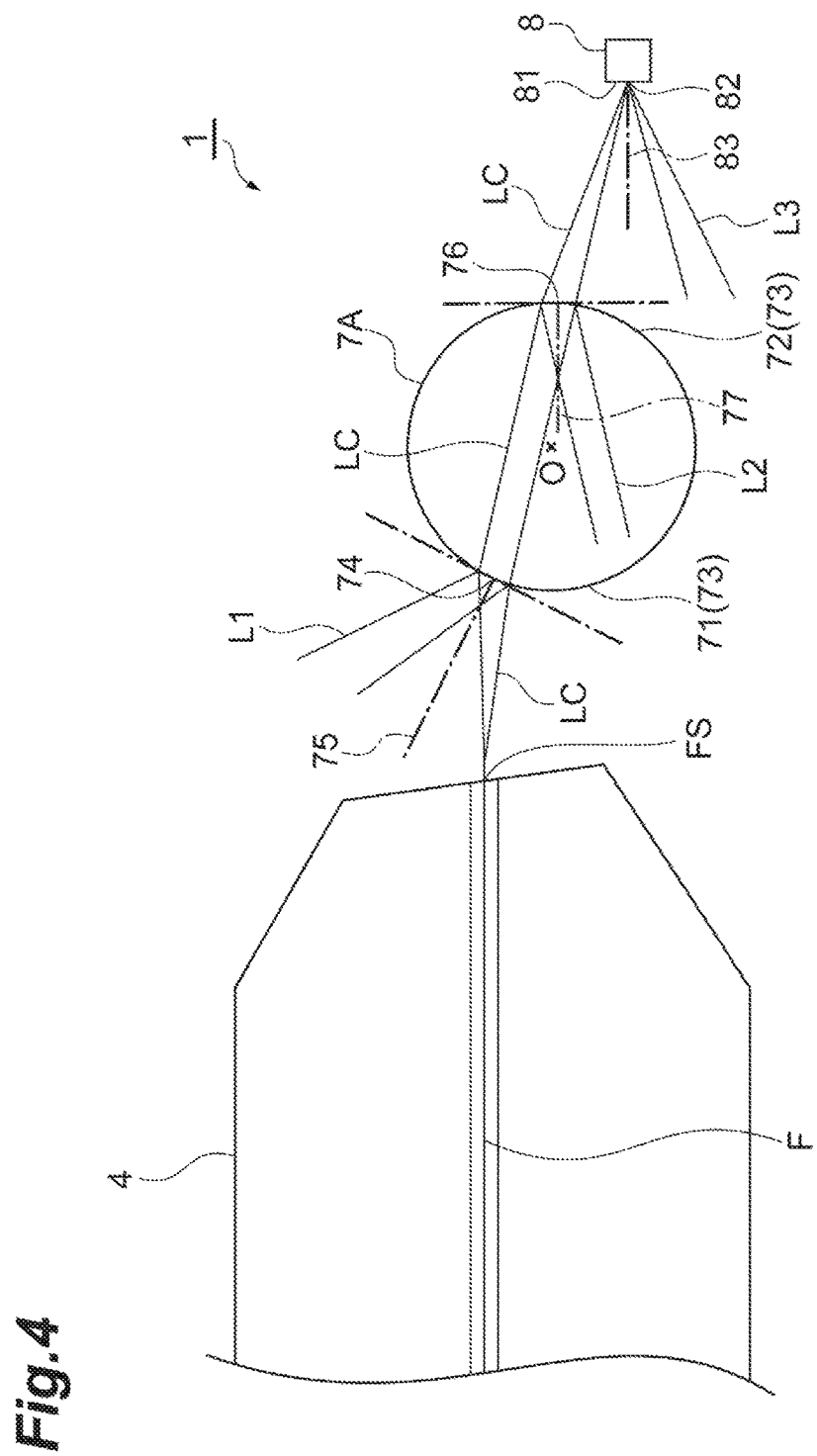
FIG. 4 is a partial cross-sectional view of the light detecting module for the OCT instrument in FIG. 2.

FIG. 4 is a partial cross-sectional view of the light detecting module for the OCT instrument in FIG. 2. Here, configurations of, especially, the optical fiber F, the ball lens 7A, the photodiode 8, and the surroundings thereof are enlarged and illustrated. Other configurations are appropriately omitted.

As illustrated in FIG. 4, the ball lens 7A includes an incident surface 71 and an exit surface 72. The interference light LC that has exited the exit end surface FS enters the incident surface 71. The interference light LC that has entered the incident surface 71 exits the exit surface 72. The ball lens 7A is a sphere with its outer surface configured of one curved surface 73. Therefore, both the incident surface 71 and the exit surface 72 of the ball lens 7A are equivalent to the curved surface 73. The ball lens 7A causes the interference light LC that has exited the exit surface 72 to converge. The ball lens 7A includes, for example, glass. The refractive index of the ball lens 7A is identical over the whole area of the ball lens 7A. The curved surface 73 is subjected to AR coating in order to prevent reflection.

The photodiode 8 includes a detecting surface (light receiving surface) 81. The converged interference light LC that has exited the exit surface 72 of the ball lens 7A enters the detecting surface 81. The detecting surface 81 is, for example, a flat surface. The detecting surface 81 may be a curved surface or tilted with respect to the base 51 (refer to FIG. 2). The detecting surface 81 is subjected to AR coating in order to prevent reflection.

In the light detecting module 1, the interference light LC is guided by the optical fiber F and exits the exit end surface FS of the optical fiber F. The exit end surface FS is polished obliquely in order to suppress return light caused by the reflection of the interference light LC. The return light is reflection light traveling toward the interference unit 102

(refer to FIG. 1) from the exit end surface FS. The inclination of the exit end surface FS is, for example, 8°.

The interference light LC that has exited the exit end surface FS enters the incident surface 71 of the ball lens 7A through the opening 33 (refer to FIG. 2). Here, the interference light LC enters obliquely with respect to a perpendicular line (normal line) 75 of the incident surface 71 at an incident position 74 of the interference light LC. Therefore, reflection light L1 caused by the incident surface 71 travels in a different direction from the exit end surface FS of the optical fiber F. As a result, multiple reflection of the interference light LC between the exit end surface FS and the incident surface 71 can be suppressed.

The interference light LC that has entered the incident surface 71 exits the exit surface 72 after passing through a position deviating from the gravity center O inside the ball lens 7A, not through the gravity center O. Here, the interference light LC exits obliquely with respect to a perpendicular line (normal line) 77 of the exit surface 72 at an exit position 76 of the interference light LC. Therefore, reflection light L2 caused by the exit surface 72 travels in a different direction from the incident position 74 of the incident surface 71. As a result, the multiple reflection of the interference light LC between the incident position 74 of the incident surface 71 and the exit position 76 of the exit surface 72 can be suppressed.

The interference light LC that has exited the exit surface 72 enters the detecting surface 81 of the photodiode 8. Here, the interference light LC enters obliquely with respect to a perpendicular line (normal line) 83 of the detecting surface 81 at an incident position 82 of the interference light LC. Therefore, reflection light L3 caused by the detecting surface 81 travels in a different direction from the exit position 76 of the exit surface 72. As a result, the multiple reflection of the interference light LC between the exit position 76 of the exit surface 72 and the incident position 82 of the detecting surface 81 can be suppressed. In this example, it can be said that the detecting surface 81 is disposed in such a manner that the interference light LC enters obliquely because the detecting surface 81 is a flat surface.

As described above, in the light detecting module 1 according to the present embodiment, the incident surface 71 of the ball lens 7A is disposed in such a manner that the interference light LC enters obliquely with respect to the perpendicular line 75 at the incident position 74 of the interference light LC. The exit surface 72 is disposed in such a manner that the interference light LC exits obliquely with respect to the perpendicular line 77 at the exit position 76 of the interference light LC. The detecting surface 81 of the photodiode 8 is disposed in such a manner that the interference light LC enters obliquely with respect to the perpendicular line 83 at the incident position 82 of the interference light LC.

With these disposements, in the light detecting module 1, the optical path of the reflection light Li caused by the incident surface 71 of the ball lens 7A, the optical path of the reflection light L2 caused by the exit surface 72 of the ball lens 7A, and the optical path of the reflection light L3 caused by the detecting surface 81 of the photodiode 8 each do not overlap the optical path of the interference light LC. In other words, none of the reflection light Li to L3 returns to the same optical path of the interference light LC. Therefore, so-called multiple reflection in which reflection light caused by a surface of an optical element is reflected on the same optical path, and the reflection light reflected again on a surface of another optical element returns to the same optical path does not occur. As a result, the multiple reflection of the interference light LC on the optical path between the exit end surface FS of the optical fiber F and the detecting surface 81 of the photodiode 8 can be prevented. Hence, the fixed pattern noise due to the multiple reflection can be sufficiently reduced.

Once the interference light LC enters the incident surface 71 obliquely with respect to the perpendicular line 75, the interference light LC exits toward the inside of the ball lens 7A obliquely with respect to the perpendicular line 75. Therefore, the incident surface 71 being disposed in such a manner that the interference light LC enters obliquely with respect to the perpendicular line 75 is synonymous with the incident surface 71 being disposed in such a manner that the interference light LC exits obliquely with respect to the perpendicular line 75. Similarly, the exit surface 72 being disposed in such a manner that the interference light LC exits obliquely with respect to the perpendicular line 77 is synonymous with the exit surface 72 being disposed in such a manner that the interference light LC enters obliquely with respect to the perpendicular line 77.

The light detecting module I includes the second insertion part 32. The second insertion part 32 functions as the cover part for covering the ball lens 7A. The opening 33 through which the interference light LC passes are formed on the second insertion part 32. Therefore, light other than the interference light LC that has entered the ball lens 7A being detected by the photodiode 8 and the light appearing on the tomographic image as the fixed pattern noise can be suppressed. As a result, the fixed pattern noise can be sufficiently reduced.

The light detecting module 1 includes the first insertion part 31. The first insertion part 31 functions as the positioning part for defining the position of the optical fiber F and positioning the exit end surface FS with respect to the opening 33. Therefore, the positions of the ball lens 7A and the photodiode 8 are set easily because the position of the optical fiber F is defined.

The OCT instrument 100 includes the light detecting module 1 for the OCT instrument. Therefore, the fixed pattern noise can be sufficiently reduced as mentioned above.

Hereinafter, it will be described in detail by an example and a comparative example that the fixed pattern noise can be sufficiently reduced according to the present embodiment.

FIG. 5(a) is a graph illustrating an intensity distribution of reflection light measured by an OCT instrument according to the example. FIG. 5(b) is a graph illustrating an intensity distribution of reflection light measured by an OCT instrument according to the comparative example.

In the example, an OCT instrument corresponding to the OCT instrument 100 according to the present embodiment mentioned above is used. In an OCT instrument according to the comparative example, a ball lens is disposed in such a manner that the gravity center thereof is placed on the center axis of the light detecting module, and a photodiode is disposed on the center axis on a sub-mount.

Here, the object is air, and measurement was conducted using laser light with a wavelength changing in a range of 1 to 1.1 μm. The horizontal axis of the graph illustrates pixels corresponding to the position in the depth direction of the object. The vertical axis illustrates the intensity of reflection light. As mentioned above, the reflection light is hardly generated by the object since the object is air. Therefore, the vertical axis substantially illustrates the intensity of the fixed pattern noise.

As illustrated in FIG. 5(a), the OCT instrument according to the example sufficiently reduced the fixed pattern noise. As illustrated in FIG. 5(b), in the OCT instrument according to the comparative example, the fixed pattern noise appeared at specific positions in the depth direction. The light detecting module of the OCT instrument according to the example has the configuration in which the multiple reflection of the interference light between the exit position of the exit surface of the optical fiber and the incident position of the detecting surface of the photodiode is prevented. In contrast, the light detecting module of the OCT instrument according to the comparative example has a configuration which easily causes the multiple reflection between the exit position of the exit surface of the optical fiber and the incident position of the detecting surface of the photodiode. Therefore, such differences occurred.

Although the embodiment of the present invention has been described as above, the present invention is not necessarily limited to the embodiment mentioned above, and various modifications can be applied thereto as long as they do not depart from the gist of the present invention.

Figure 6:
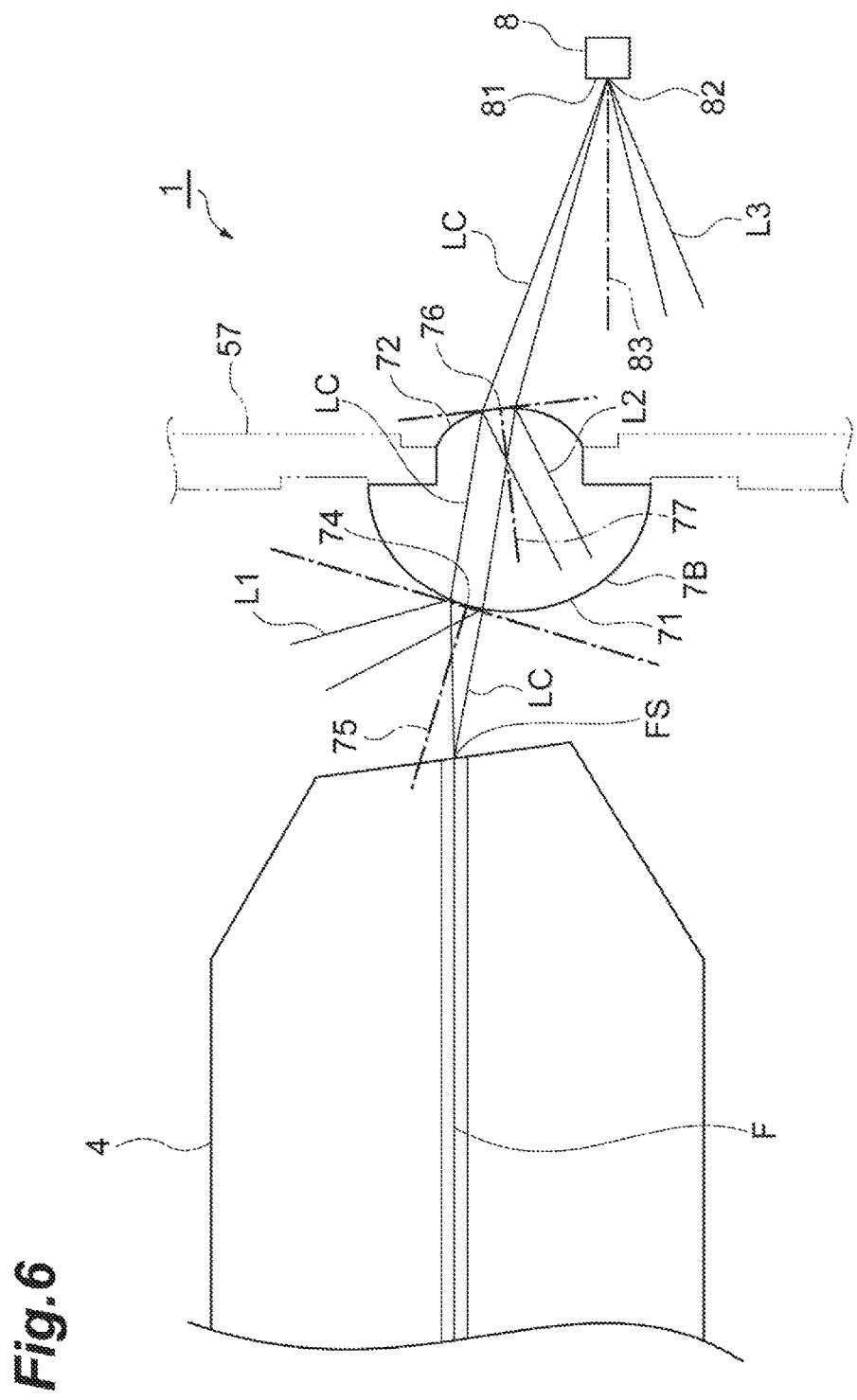
FIG. 6 is a partial cross-sectional view of a light detecting module for an OCT instrument according to a modified example.

FIG. 6 is a partial cross-sectional view of a light detecting module for an OCT instrument according to a modified example. As illustrated in FIG. 6, a light detecting module 1 may include a fused lens (optical lens) 7B instead of the ball lens 7A (refer to FIG. 2). Here, configurations of, especially, an optical fiber F, the fused lens 7B, a photodiode 8, and the surroundings thereof are enlarged and illustrated. Other configurations are appropriately omitted.

The fused lens 7B is an optical lens in which both an incident surface 71 and an exit surface 72 have convex shapes. Such a convex shape can be made, for example, by utilizing surface tension of melted glass.

In this case, interference light LC enters obliquely with respect to a perpendicular line 75 of the incident surface 71 at an incident position 74 of the interference light LC when the interference light LC enters the incident surface 71 of the fused lens 7B. Therefore, reflection light L1 caused by the incident surface 71 travels in a different direction from an exit end surface FS of the optical fiber F. As a result, multiple reflection of the interference light LC between the exit end surface FS and the incident surface 71 can be suppressed.

The interference light LC exits obliquely with respect to a perpendicular line 77 of the exit surface 72 at an exit position 76 of the interference light LC when the interference light LC exits the exit surface 72 of the fused lens 7B. Therefore, reflection light L2 caused by the exit surface 72 travels in a different direction from the incident position 74 of the incident surface 71. As a result, multiple reflection of the interference light LC between the incident position 74 of the incident surface 71 and the exit position 76 of the exit surface 72 can be suppressed.

Therefore, multiple reflection of the interference light LC on the optical path between the exit end surface FS of the optical fiber F and a detecting surface 81 of the photodiode 8 can be prevented even in a case of using the fused lens 7B. Hence, the fixed pattern noise due to the multiple reflection can be sufficiently reduced.

The curved surfaces of the fused lens 7B can be formed by melting glass as mentioned above. Therefore, manufacturing of the light detecting module 1 can be simplified.

Figure 7:
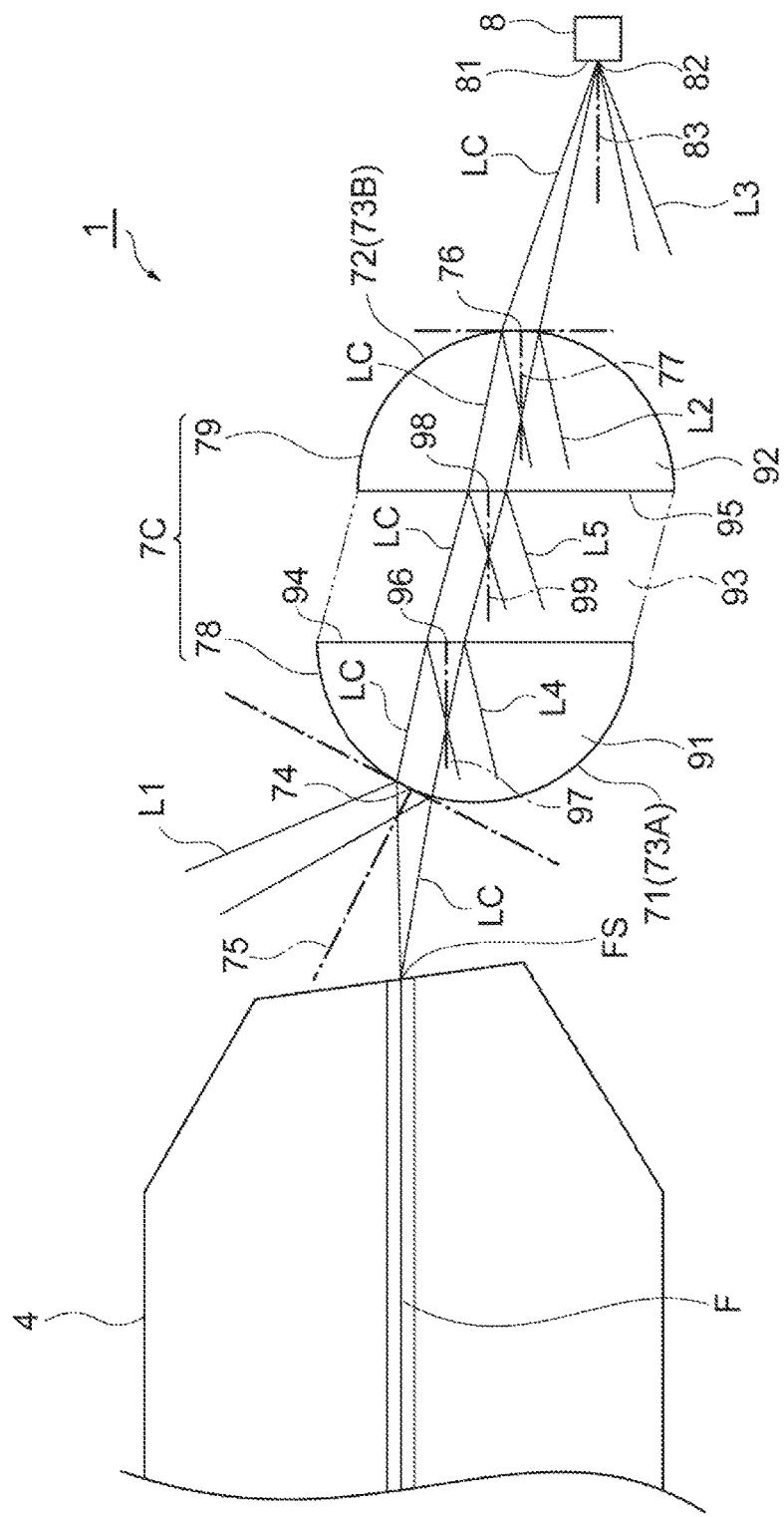
FIG. 7 is a partial cross-sectional view of a light detecting module for an OCT instrument according to another modified example.

FIG. 7 is a partial cross-sectional view of a light detecting module for an OCT instrument according to another modified example. As illustrated in FIG. 7, a light detecting module 1 may include divided lenses (optical lenses) 7C instead of the ball lens 7A (refer to FIG. 2). The divided lenses 7C include two semi-spherical lenses 78 and 79. The two semi-spherical lenses 78 and 79 are disposed spatially apart from each other. Here, configurations of, especially, an optical fiber F, the semi-spherical lenses 78 and 79, a photodiode 8, and the surroundings thereof are enlarged and illustrated. Other configurations are appropriately omitted.

The semi-spherical lenses 78 and 79 respectively include curved surfaces 73A and 73B and flat surfaces 94 and 95. The flat surfaces 94 and 95 of the semi-spherical lenses 78 and 79 are disposed in parallel and oppose each other with a predetermined distance therebetween. The semi-spherical lens 78 is disposed on the side of an exit end surface FS of the optical fiber F. The semi-spherical lens 79 is disposed on the side of the photodiode 8. The curved surface 73A of the semi-spherical lens 78 opposes the exit end surface FS of the optical fiber F. The curved surface 73B of the semi-spherical lens 79 opposes the photodiode 8.

In this modified example, the divided lenses 7C include a first region 91, a second region 92, and a third region 93. The first region 91 corresponds to the semi-spherical lens 78. The second region 92 corresponds to the semi-spherical lens 79. The third region 93 is between the semi-spherical lens 78 and the semi-spherical lens 79. Here, the refractive index of the third region 93 is different from those of the first region 91 and the second region 92 since the third region 93 is air. The flat surface 94 corresponds to an interface between the first region 91 and the third region 93. The flat surface 95 corresponds to an interface between the second region 92 and the third region 93. The curved surface 73A corresponds to an incident surface 71. The curved surface 73B corresponds to an exit surface 72.

Interference light LC that has exited the exit end surface FS of the optical fiber F enters the incident surface 71. Here, the interference light LC enters obliquely with respect to a perpendicular line 75 of the incident surface 71 at an incident position 74 of the interference light LC. Therefore, the reflection light L1 caused by the incident surface 71 travels in a different direction from the exit end surface FS of the optical fiber F. As a result, multiple reflection of the interference light LC between the exit end surface FS and the incident surface 71 can be suppressed.

The interference light LC that has entered the incident surface 71 travels inside the semi-spherical lens 78 and exits the flat surface 94. Here, the interference light LC exits obliquely with respect to a perpendicular line (normal line) 97 of the flat surface 94 at the exit position 96 of the interference light LC. Therefore, reflection light L4 caused by the flat surface 94 travels in a different direction from the incident position 74 of the incident surface 71. As a result, multiple reflection of the interference light LC between the incident position 74 of the incident surface 71 and the exit position 96 of the flat surface 94 can be suppressed.

The interference light LC that has exited the flat surface 94 travels in the air and enters the flat surface 95. Here, the interference light LC enters obliquely with respect to a perpendicular line (normal line) 99 of the flat surface 95 at an incident position 98 of the interference light LC. Therefore, reflection light L5 caused by the flat surface 95 travels in a different direction from the exit position 96 of the flat surface 94. As a result, multiple reflection of the interference light LC between the exit position 96 of the flat surface 94 and the incident position 98 of the flat surface 95 can be suppressed.

The interference light LC that has entered the flat surface 95 travels inside the semi-spherical lens 79 and exits the exit surface 72. The interference light LC exits obliquely with respect to a perpendicular line 77 of the exit surface 72 at an exit position 76 of the interference light LC. Therefore, reflection light L2 caused by the exit surface 72 travels in a different direction from the incident position 98 of the flat surface 95. As a result, multiple reflection of the interference light LC between the incident position 98 of the flat surface 95 and the exit position 76 of the exit surface 72 can be suppressed.

Therefore, the multiple reflection of the interference light LC on the optical path between the exit end surface FS of the optical fiber F and a detecting surface 81 of the photodiode 8 can be suppressed even in a case of using the semi spherical lenses 78 and 79 as the divided lenses 7C. Hence, the fixed pattern noise due to the multiple reflection can be sufficiently reduced. A plurality of lenses disposed spatially apart from each other may be used as the divided lenses 7C instead of the semi-spherical lenses 78 and 79.

For example, an optical lens other than the fused lens 7B and the divided lenses 7C may be used instead of the ball lens 7A. In this case, the incident surface 71, the exit surface 72, and the detecting surface 81 of the photodiode 8 should at least be disposed in such a manner that the multiple reflection of the interference light LC is prevented as described above.

In the above description, the refractive index of the ball lens 7A is the same over the whole area. However, the refractive index is not limited to this. The ball lens 7A may further include a plurality of regions with different refractive indices on the optical path of the interference light LC between the incident surface 71 and the exit surface 72, and interfaces entered by the interference light between the plurality of regions, for example, by including a plurality of materials. In this case, as long as the interface is disposed in such a manner that the interference light LC obliquely enters the interface with respect to the perpendicular line of the interface at the incident position of the interference light LC, the multiple reflection of the interference light LC can be prevented and the fixed pattern noise can be reduced.

In the above description, the incident surface 71 is disposed in such a manner that the multiple reflection of all light included in the luminance flux of the interference light LC is suppressed. However, the incident surface 71 only has to be disposed in such a manner that the multiple reflection of at least a part of the light included in the luminance flux of the interference light LC is suppressed. This also applies to the exit surface 72, the detecting surface 81, and the flat surfaces 94 and 95 which are the interfaces.

The positioning part only has to define a position of the optical fiber F. Therefore, the positioning part may include a part other than the first insertion part 31. The light detecting module 1 may not include the positioning part.

The cover part only has to prevent light other than the interference light LC from being detected by the photodiode 8 and appearing as noise on a tomographic image. The cover part may include a part other than the second insertion part 32. When the amount of light other than the interference light LC is small, the light detecting module 1 may not include the cover part.

The OCT instrument 100 is not limited to that of the SS-OCT system. The OCT instrument 100 may be of, for example, a time-domain OCT (TD-OCT) system or a spectral-domain OCT (SD-OCT) system.

REFERENCE SIGNS LIST

1 Light Detecting Module for OCT Instrument (Light Detection Module)
31 First Insertion Part (Positioning Part)
32 Second Insertion Part (Cover Part)
33 Opening
7A Ball Lens (Optical Lens)
7B Fused Lens (Optical Lens)
7C Divided Lenses (Optical Lenses)
71 Incident Surface
72 Exit Surface
74 Incident Position
75 Perpendicular Line
76 Exit Position
77 Perpendicular Line
8 Photodiode (Photodetector)
78, 79 Semi-Spherical Lens (Lens)
81 Detecting Surface
82 Incident Position
83 Perpendicular Line
91 First Region
92 Second Region
93 Third Region
94 Flat Surface (Interface)
95 Flat Surface (Interface)
100 OCT Instrument
F Optical Fiber
FS Exit End Surface
LC Interference Light

The invention claimed is:

1. A light detecting module for an OCT instrument, the light detecting module being configured to detect interference light that has exited an exit end surface of an optical fiber in an OCT instrument, the light detecting module comprising:
   an optical lens including an incident surface entered by the interference light that has exited the exit end surface, and an exit surface exited by the interference light that has entered the incident surface; and
   a photodetector including a detecting surface entered by the interference light that has exited the exit surface, wherein
   the incident surface is disposed in such a manner that the interference light obliquely enters with respect to a perpendicular line at an incident position of the interference light,
   the exit surface is disposed in such a manner that the interference light obliquely exits with respect to a perpendicular line at an exit position of the interference light, and
   the detecting surface is disposed in such a manner that the interference light obliquely enters with respect to a perpendicular line at an incident position of the interference light.

2. The light detecting module according to claim 1, further comprising a cover part covering the optical lens, wherein an opening through which the interference light passes is formed on the cover part.

3. The light detecting module according to claim 2, wherein the cover part includes a positioning part configured to define a position of the optical fiber and position the exit end surface with respect to the opening, the cover part and the positioning part having a common center axis.

4. The light detecting module according to claim 1, wherein the optical lens is a ball lens.

5. The light detecting module according to claim 1, wherein the optical lens is a fused lens.

6. The light detecting module according to claim 1, wherein the optical lens is a plurality of lenses disposed spatially apart from each other.

7. An OCT instrument comprising the light detecting module according to claim 1.

8. A light detecting module for an OCT instrument, the light detecting module being configured to detect interference light that has exited an exit end surface of an optical fiber in an OCT instrument, the light detecting module comprising:
- an optical lens including an incident surface entered by the interference light that has exited the exit end surface, an exit surface exited by the interference light that has entered the incident surface, a plurality of regions with different refractive indices on an optical path, between the incident surface and the exit surface, and an interface entered by the interference light between the plurality of regions, wherein the interface is disposed in such a manner that the interference light obliquely enters with respect to a perpendicular line at an incident position of the interference light; and
- a photodetector including a detecting surface entered by the interference light that has exited the exit surface, wherein
- the incident surface is disposed in such a manner that the interference light obliquely enters with respect to a perpendicular line at an incident position of the interference light,
- the exit surface is disposed in such a manner that the interference light obliquely exits with respect to a perpendicular line at an exit position of the interference light, and
- the detecting surface is disposed in such a manner that the interference light obliquely enters with respect to a perpendicular line at an incident position of the interference light.

* * * * *